US011639748B1

(12) United States Patent
Duan et al.

(10) Patent No.: US 11,639,748 B1
(45) Date of Patent: May 2, 2023

(54) ELECTRIFIED PROPULSION SYSTEM AND APPARATUS

(71) Applicant: GM GLOBAL TECHNOLOGY OPERATIONS LLC, Detroit, MI (US)

(72) Inventors: Chengwu Duan, Shanghai (CN); Dongxu Li, Troy, MI (US); Jian Yao, Shanghai (CN); Chunhao J. Lee, Troy, MI (US); Norman K. Bucknor, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/560,552

(22) Filed: Dec. 23, 2021

(30) Foreign Application Priority Data

Nov. 30, 2021 (CN) .......................... 202111444855.X

(51) Int. Cl.
*F16H 45/02* (2006.01)
*F16H 41/24* (2006.01)
*B60K 17/02* (2006.01)
*B60K 1/00* (2006.01)

(52) U.S. Cl.
CPC ............... *F16H 45/02* (2013.01); *B60K 1/00* (2013.01); *B60K 17/02* (2013.01); *F16H 41/24* (2013.01); *F16H 2045/0205* (2013.01)

(58) Field of Classification Search
CPC .. F16H 45/02; F16H 41/24; F16H 2045/0205; F16H 2041/246
See application file for complete search history.

(56) References Cited

U.S. PATENT DOCUMENTS

| 2020/0139801 | A1* | 5/2020 | Lamers | B60K 17/10 |
| 2021/0254694 | A1* | 8/2021 | Binder | F16H 41/24 |
| 2021/0260984 | A1* | 8/2021 | Campton | B60K 6/383 |
| 2022/0219525 | A1* | 7/2022 | Walega | B60K 6/40 |

FOREIGN PATENT DOCUMENTS

| DE | 102019118071 A1 | 1/2021 |
| JP | 2011-231857 A | 11/2011 |

* cited by examiner

*Primary Examiner* — Huan Le
(74) *Attorney, Agent, or Firm* — Quinn IP Law

(57) ABSTRACT

An electrified drivetrain system that improves drivability is described. It includes a propulsion system having a rotary electric machine including a rotatable shaft, a torque converter including a fluidic stator, a pump, a turbine and a normally-closed torque converter clutch; a selectable one-way clutch coupled to the fluidic stator; and an output member. The rotatable shaft is coupled to the pump of the torque converter, and the turbine of the torque converter is coupled to the output member.

5 Claims, 2 Drawing Sheets

ELECTRIFIED PROPULSION SYSTEM AND APPARATUS

CROSS-REFERENCE TO RELATED APPLICATIONS

This application claims the benefit of China Patent Application No. 202111444855.X, which was filed on Nov. 30, 2021, the disclosure of which is hereby incorporated by reference in its entirety.

TECHNICAL FIELD

The present disclosure relates to electrified drivetrain systems for vehicles.

BACKGROUND

Electrified drivetrains for vehicles include for example, battery electric vehicles, extended-range electric vehicles, plug-in hybrid electric vehicles and fuel cell hybrid electric vehicles. As is appreciated by skilled practitioners, design of electrified drivetrains includes optimization and tradeoffs between tractive power, weight, packaging volume, driving range, drivability, and other factors. Vehicle designers strive to achieve a fast, lightweight, responsive drivetrain system that can be packaged in a vehicle and is able to travel long distances with minimal need for electric charging.

Electric machines convert electrical energy into mechanical work by the production of torque. Electric vehicles, including hybrid vehicles, employ electric motors, such as induction motors and permanent magnet motors, to propel the vehicles, as well as to capture braking energy when acting as an electric generator. Generally, the electric motor includes a rotor that rotates during operation and an electric stator that is stationary. The rotor may contain a plurality of permanent magnets and rotates relative to the fixed electric stator. The rotor is connected to a shaft that also rotates with the rotor. The rotor, including the permanent magnets, is separated from the electric stator by a predetermined air gap. The electric stator includes conductors in the form of wire windings. When electrical energy is applied through the conductive wire windings, a magnetic field is generated. When electric energy or power is fed into the conductive windings of the electric stator, the power can be transferred over the air gap by a magnetic flux creating torque that acts on the permanent magnets in the rotor. In this manner, mechanical power can be transferred to or extracted from the rotating shaft. In an electric vehicle, the rotor thus transmits torque via the rotating shaft through a gear set to the drive wheels of the vehicle.

Direct coupling of a rotary electric machine to a drivetrain may lead to undesirable noise, vibration and/or harshness conditions under some operating states.

There is a need for incorporation of a torque management device into an electrified drivetrain to improve drivability.

SUMMARY

An electrified drivetrain system that maximizes power density, is readily packaged, and improves drivability is described. It includes a propulsion system having a rotary electric machine including a rotatable shaft, a torque converter including a fluidic stator, a pump, a turbine and a normally-closed torque converter clutch; a selectable one-way clutch coupled to the fluidic stator; and an output member. The rotatable shaft is coupled to the pump of the torque converter, and the turbine of the torque converter is coupled to the output member.

An aspect of the disclosure includes the torque converter clutch being a normally-closed clutch, with the torque converter clutch being controlled to an open state during a launch maneuver.

Another aspect of the disclosure includes the torque converter clutch being a dog clutch.

Another aspect of the disclosure includes the torque converter clutch being a preloaded friction clutch.

Another aspect of the disclosure includes the torque converter clutch being an electro-magnetic clutch.

Another aspect of the disclosure includes the selectable one-way clutch being coupled between the fluidic stator and a stationary frame member.

Another aspect of the disclosure includes the selectable one-way clutch being controlled to couple the fluidic stator to the stationary frame member in a first rotational direction when the propulsion system is controlled to operate in a first direction.

Another aspect of the disclosure includes the selectable one-way clutch being controlled to couple the fluidic stator to the stationary frame member in a second rotational direction opposite to the first rotational direction when the propulsion system is controlled to operate in a second direction opposite to the first direction.

Another aspect of the disclosure includes a propulsion system including a rotary electric machine including a rotatable shaft; a torque converter, including a fluidic stator, a pump, a turbine and a normally-closed torque converter clutch; a selectable one-way clutch coupled to the fluidic stator; an output member; and a drivetrain. The rotatable shaft of the rotary electric machine is coupled to the pump of the torque converter, and the turbine of the torque converter is coupled to the output member. The output member is coupled to the drivetrain.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

Figure 1:
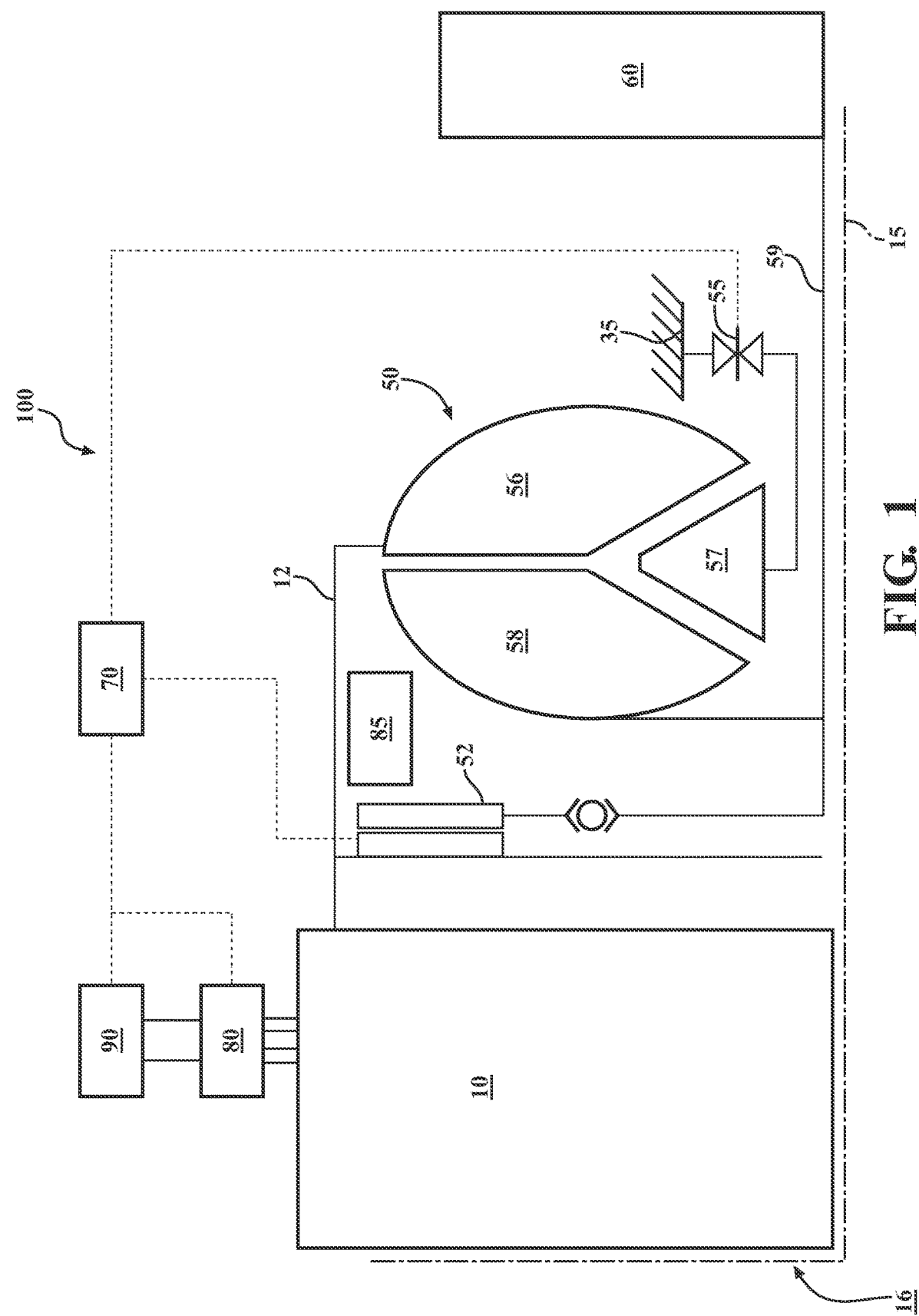
FIG. 1 schematically illustrates a propulsion system for an electrified drivetrain including an embodiment of a rotary electric machine coupled to a torque converter, in accordance with the disclosure.

Referring now to the drawings, wherein the showings are for the purpose of illustrating certain exemplary embodiments only and not for the purpose of limiting the same, FIG. 1 schematically shows elements of an embodiment of a propulsion system 100 that includes a rotary electric machine 10 that is coupled via a torque converter 50 to a drivetrain 60 and controlled by a controller 70. Like numerals refer to like elements throughout the description. The description is provided in context of an axial orientation with axial reference line 15 and radial reference line 16. An axial flux rotary electric machine is a form of electric motor construction where there is a gap between the rotor and electric stator, and therefore the direction of magnetic flux between the two, is aligned parallel with the axis of rotation. In one embodiment, and as described herein, the rotary electric machine 10 is configured as a brushless permanent magnet direct-current (DC) motor. In one embodiment, the rotary electric machine 10 includes a rotatable shaft 12 that is coupled to the torque converter 50, which is coupled to the drivetrain 60 for providing propulsion torque.

In one embodiment, the propulsion system 100 is arranged on a vehicle, and the drivetrain 60 terminates at one or multiple vehicle wheels to provide tractive effort. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

In one embodiment, the drivetrain 60 includes a fixed-gear or continuously variable transmission that couples to vehicle wheels via a driveshaft, a transaxle, or a differential. In one embodiment, the propulsion system 100 is arranged as a stationary device, and the drivetrain 60 terminates at an actuator such as a fluidic pump.

The rotary electric machine 10 is a high-voltage multi-phase electric motor/generator configured to convert stored electric energy to mechanical power and convert mechanical power to electric energy that may be stored in a high-voltage energy storage device (battery) 90. The battery 90 may be a high-voltage energy storage device, e.g., a multi-cell lithium ion device, an ultra-capacitor, or another device without limitation. Monitored parameters related to the battery 90 may include a state of charge (SOC), temperature, and others. In one embodiment, the battery 90 may electrically connect via an on-vehicle battery charger (not shown) to a remote, off-vehicle electric power source for charging while the vehicle is stationary. The battery 90 electrically connects to an inverter module 80 via a high-voltage DC bus to transfer high-voltage DC electric power via three-phase conductors to the rotary electric machine 10 in response to control signals originating in the controller 70.

Referring again to FIG. 1, the rotary electric machine 10 electrically connects via the inverter module 80 to a high-voltage bus to the battery 90. The inverter module 80 is configured with control circuits including power transistors, e.g., IGBTs for transforming high-voltage DC electric power to high-voltage AC electric power and transforming high-voltage AC electric power to high-voltage DC electric power. The inverter module 80 may employ pulsewidth-modulating (PWM) control of the IGBTs to convert stored DC electric power originating in the battery 90 to AC electric power to drive the rotary electric machine 10 to generate torque. Similarly, the inverter module 80 converts mechanical power transferred to the rotary electric machine 10 to DC electric power to generate electric energy that is storable in the battery 90, including as part of a regenerative braking control strategy. The inverter module 80 receives motor control commands and controls inverter states to provide the motor drive and regenerative braking functionality. In one embodiment, a DC/DC electric power converter electrically connects to the high-voltage bus to provide electric power to a low-voltage battery via a low-voltage bus. The low-voltage battery electrically connects to an auxiliary power system to provide low-voltage electric power to low-voltage systems on the vehicle, including, e.g., electric windows, HVAC fans, seats, and other devices. The controller 70 is operatively connected to the inverter module 80 to control transfer of electric power between the battery 90 and a plurality of radially oriented electrically conductive windings of the stator of the rotary electric machine 10. The controller 70 controls the inverter module 80 to sequentially electrically activate electrically conductive windings to exert a rotating magnetic force on a rotor to effect rotation, or to react torque to retard rotation.

The torque converter 50 may be a fluidic torque coupling device that is coaxially arranged between the rotary electric machine 10 and the drivetrain 60. The torque converter 50 includes a pump 56 that is rotatably coupled to the rotatable shaft 12, a fluidic stator 57, and a turbine 58 that is rotatably coupled to the output member 59 that rotatably couples to the drivetrain 60. The torque converter 50 also includes a controllable torque converter clutch 52 and a selectable one-way clutch (SOWC) 55. The torque converter clutch 52 may be configured as a dog clutch, a preloaded friction clutch, or an electro-magnetic clutch. The torque converter clutch 52 is arranged as a normally closed clutch that is controlled to an open or deactivated state to enable operation of the torque converter 50 in a slip state under certain operating conditions, e.g., during a launch maneuver or a gear shift transition. This arrangement of the torque converter clutch 52 as normally closed reduces energy consumption for actuation and deactivation, and helps to improve operation in reverse on a grade.

The torque converter 50 operates to provide fluidic torque coupling between the pump 56 and the turbine 58 when the clutch 52 is deactivated or released, and provides mechanical torque coupling between the pump 56 and the turbine 58 when the clutch 52 is activated. There may be a differential in rotational speeds of the pump 56 and the turbine 58 when the clutch 52 is deactivated or released due to the fluid torque coupling, referred to as torque converter clutch slip. Torque converter clutch slip is measurable employing rotational speed sensors. The SOWC 55 is arranged to selectively couple the fluidic stator 57 to the stationary frame member 35, and thus facilitates operation in reverse when activated by enabling torque multiplication during reverse operation of the rotary electric machine 10.

The SOWC 55 is designed to have two modes of operation including a forward mode, wherein an input race is free to rotate with respect to an output race; and a reverse mode, wherein the input race is mechanically locked to the output race in at least one rotational direction. A forward/reverse selection mechanism is either hydraulically or electrically controlled. The SOWC 55 includes a one-way clutch mechanism, a locking mechanism, and an actuator that is connected to and controlled by the controller 70. The locking mechanism selectively locks and unlocks the one-way clutch mechanism, and may include rocker, diode, strut, or dog clutch type locking mechanisms. When the actuator controls the locking mechanism of the SOWC 55 to a first state, the output may rotate freely relative to the input in a first rotational direction but may not rotate freely relative to the input in a second, opposite rotational direction, thus enabling rotation of the output member 59 to urge the drivetrain 60 in a first direction, e.g., in a forward direction.

When the actuator controls the locking mechanism of the SOWC 55 to a second state, the output may not rotate freely relative to the input in the first rotational direction but may rotate freely relative to the input in a second, opposite rotational direction thus enabling rotation of the output member 59 to urge the drivetrain 60 in a second direction that is opposite to the first direction, e.g., in a reverse direction. A number of SOWC designs are known, including sprag-type, strut-type, roller-type, diode-type, or pawl-type and the disclosure is not intended to be limited to the particular exemplary embodiments described herein.

The addition of the SOWC 55 facilitates the coupling of the fluidic stator 57 to the stationary frame member 35 in a first rotational direction (e.g., clockwise) or a second, opposite rotational direction (e.g., counter-clockwise). When operation of the propulsion system 100 is commanded in a forward direction, SOWC 55 allows the fluidic stator 57 to rotate in the first rotational direction, but not in the second, opposite rotational direction. When operation of the propulsion system 100 is commanded in a reverse direction, SOWC 55 allows the fluidic stator 57 to rotate in the second, opposite rotational direction, but not in the first rotational direction. Thus, the torque converter 50 is able to provide torque-multiplication between the rotary electric machine 10 and the drivetrain 60 in both the first rotational direction and in the second, opposite rotational direction.

The rotatable shaft 12 couples to the pump 56 of the torque converter 50 to transfer torque to the output member 59, which is coupled to an embodiment of the drivetrain 60 in one embodiment.

The drivetrain 60 includes one or more of a transmission, a differential, transaxles, half-shafts, etc. In one embodiment, the drivetrain 60 includes a transmission. The transmission may be arranged in a step-gear configuration in one embodiment, and may include one or more differential gear sets and activatable clutches configured to effect torque transfer in one of a plurality of fixed gear states over a range of speed ratios between output member 59 of the torque converter 50 and a drivetrain component. The transmission may be one of various configurations, and may be an automatic transmission that automatically shifts between the fixed gear states.

The drivetrain 60 may include a gearset that mechanically couples to one or more axles that mechanically couple to one or more wheels in one embodiment. The drivetrain transfers tractive power to a road surface. The gearset of the drivetrain 60 may be in the form of a front transaxle and half-shafts (not shown) that rotatably couple the output member 59 to one or more of the wheels. Alternatively, the gearset may be in the form of a rear differential and axles that rotatably couple the output member 59 to one or more of the wheels. Alternatively, the gearset may be in the form of both a front transaxle arranged in conjunction with a rear driveshaft coupled to a differential that rotatably couple the output member 59 to one or more of vehicle wheels. Alternatively, or in addition, a power take-off (PTO) gear box (not shown) may be rotatably coupled to the output member 59. The propulsion system 100 is illustrative, and the concepts described herein apply to other propulsion systems that are similarly configured.

In one embodiment, a fluidic system 85 is arranged to supply hydraulic fluid to the torque converter 50, and is also fluidly connected to heat exchange elements arranged on the rotary electric machine 10 and on the inverter module 80. The fluidic system 85 includes, by way of non-limiting examples, a fluidic pump, a sump, a cooling element, and associated plumbing circuit elements, and is configured to provide hydraulic fluid to the torque converter 50 and remove heat from the rotary electric machine 10 and the inverter module 80.

The terms controller, control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic routines to control operation of actuators. Routines may be periodically executed at regular intervals, for example each 100 microseconds or 3.125, 6.25, 12.5, 25 and 100 milliseconds during ongoing operation. Alternatively, routines may be executed in response to occurrence of a triggering event. Communication between controllers, and communication between controllers, actuators and/or sensors may be accomplished using a direct wired link, a networked communication bus link, a wireless link, a serial peripheral interface bus or another communication link. Communication includes exchanging data signals in various forms, including, for example, electrical signals via a conductive medium, electromagnetic signals via air, optical signals via optical waveguides, and the like. Data signals may include signals representing inputs from sensors, signals representing actuator commands, and communication signals between controllers. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

Figure 2:
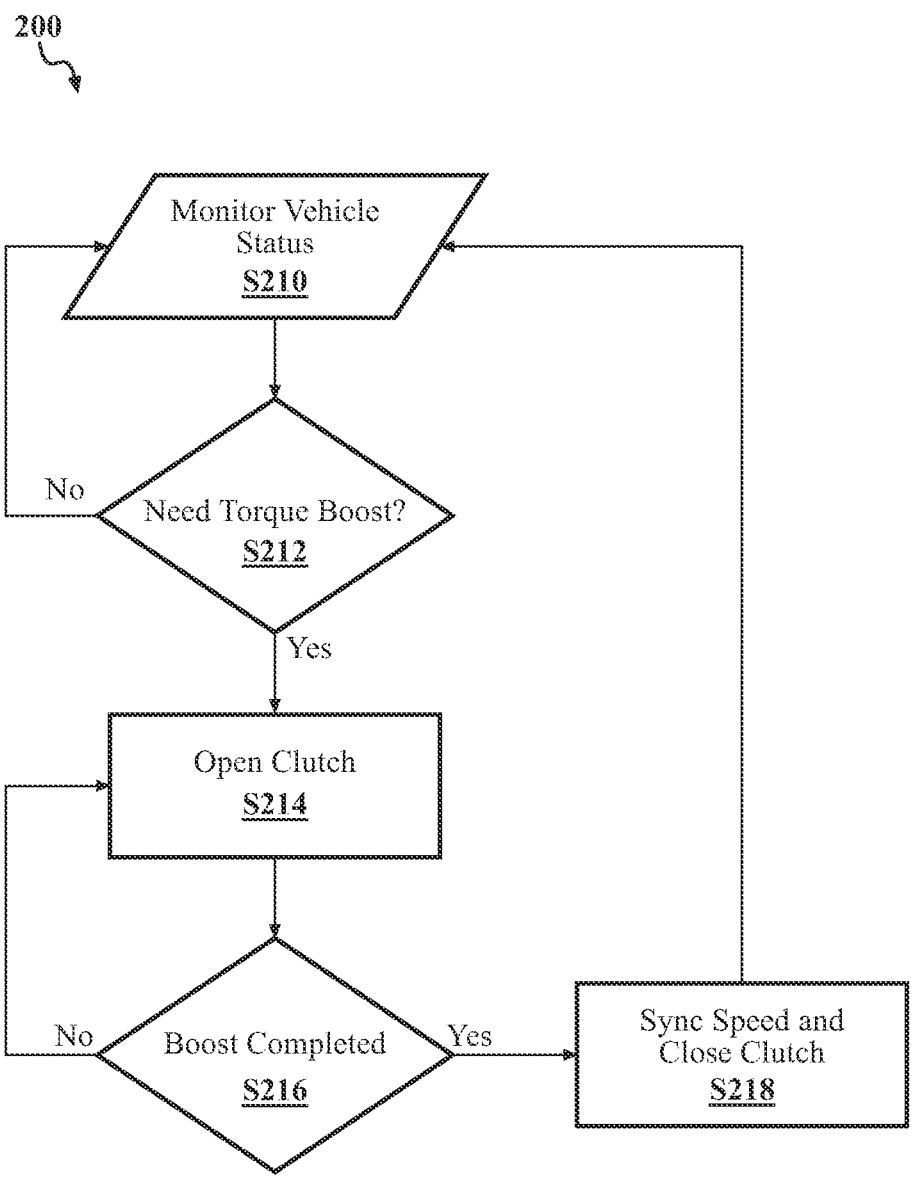
FIG. 2 schematically illustrates a torque converter control process for controlling operation of an embodiment of a torque converter employed on an embodiment of the propulsion system described with reference to FIG. 1, in accordance with the disclosure.

FIG. 2 schematically illustrates a torque converter control process 200 for controlling operation of an embodiment of the propulsion system 100 described with reference to FIG. 1, including the rotary electric machine 10, torque converter 50, and drivetrain 60. The process 200 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations.

During vehicle operation, the vehicle is monitored (S210). Monitored parameters may include an operator request for acceleration or deceleration, and other parameters related to vehicle speed, etc.

When the monitored parameters indicate a request or demand for a torque boost, such as may be related to a request for vehicle acceleration, a request for a transmission gear change, a request for vehicle braking and associated regenerative braking for battery charging, a launch maneuver, etc. (S212), the torque converter clutch 52 is commanded to an open or deactivated state in order to facilitate a fluidic torque coupling in a slip state between the pump 56 and the turbine 58 of the torque converter 50 (S214). Operation of the vehicle is monitored, and when the need for the torque boost is completed (S216), the rotary electric machine 10 is controlled to synchronize speeds to enable activation of the torque converter clutch 52 and thus achieve a mechanical coupling (S218).

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A propulsion system, comprising:
    a rotary electric machine including a rotatable shaft;
    a torque converter, including a fluidic stator, a pump, a turbine and a normally-closed torque converter clutch;
    a selectable one-way clutch coupled to the fluidic stator; and
    an output member rotatably coupled to a drivetrain;
    wherein the rotatable shaft is coupled to the pump of the torque converter;
    wherein the turbine of the torque converter is coupled to the output member;
    wherein the selectable one-way clutch is coupled between the fluidic stator and a stationary frame member;
    wherein the selectable one-way clutch is controllable to couple the fluidic stator to the stationary frame member in a first rotational direction when the propulsion system is operated in a forward direction to provide torque-multiplication between the rotary electric machine and the drivetrain in the first rotational direction; and
    wherein the selectable one-way clutch is controllable to couple the fluidic stator to the stationary frame member in a second rotational direction opposite to the first rotational direction when the propulsion system is operated in a reverse direction to provide torque-multiplication between the rotary electric machine and the drivetrain in the second rotational direction.

2. The propulsion system of claim 1, wherein the normally-closed torque converter clutch is controlled to an open state under certain operating conditions.

3. The propulsion system of claim 1, wherein the normally-closed torque converter clutch comprises a dog clutch.

4. The propulsion system of claim 1, wherein the normally-closed torque converter clutch comprises a preloaded friction clutch.

5. The propulsion system of claim 1, wherein the normally-closed torque converter clutch comprises an electromagnetic clutch.

* * * * *